(12) United States Patent
Lei et al.

(10) Patent No.: US 9,991,808 B2
(45) Date of Patent: Jun. 5, 2018

(54) CROSS REGULATION CIRCUIT FOR MULTIPLE OUTPUTS AND CROSS REGULATION METHOD THEREOF

(71) Applicant: Siemens Aktiengesellschaft, Munich (DE)

(72) Inventors: Zhi Tong Lei, Chengdu (CN); Yu Meng He, Chengdu (CN); Feng Zhang, Nanjing (CN)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days. days.

(21) Appl. No.: 15/109,144

(22) PCT Filed: Jul. 7, 2014

(86) PCT No.: PCT/CN2014/081778
§ 371 (c)(1),
(2) Date: Jun. 30, 2016

(87) PCT Pub. No.: WO2016/004571
PCT Pub. Date: Jan. 14, 2016

(65) Prior Publication Data
US 2017/0126139 A1 May 4, 2017

(51) Int. Cl.
*H02M 3/335* (2006.01)
(52) U.S. Cl.
CPC ... *H02M 3/33561* (2013.01); *H02M 3/33523* (2013.01)
(58) Field of Classification Search
CPC .. H02M 3/156; H02M 3/33523; H02M 3/335; H02M 3/33561
See application file for complete search history.

(56) References Cited

U.S. PATENT DOCUMENTS

| 7,227,762 B1* | 6/2007 | Cheung | H01F 27/42 363/21.12 |
|---|---|---|---|
| 2004/0100740 A1 | 5/2004 | Iwashita | |

(Continued)

FOREIGN PATENT DOCUMENTS

| CN | 1507141 A | 6/2004 |
|---|---|---|
| CN | 101064475 A | 10/2007 |

(Continued)

OTHER PUBLICATIONS

International Search Report and Written Opinion dated Jan. 6, 2015.
(Continued)

*Primary Examiner* — Fred E Finch, III
*Assistant Examiner* — Lorena Bruner
(74) *Attorney, Agent, or Firm* — Harness, Dickey & Pierce, P.L.C.

(57) ABSTRACT

A cross regulation circuit for multiple outputs, includes an input end and at least two output ends. A first output end of the at least two output ends is connected to a feedback circuit. The feedback circuit is connected to the input end and used for maintaining the output voltage of the first output end by adjusting the input end. A first resistor and a first inductor are sequentially connected in series on the upstream of each of other output ends than the first output end and are used for performing cross regulation. In the cross regulation method of the circuit, simultaneous equations are established through parasitic inductance on any output branch and load thereof as well as parasitic inductance on the first output branch so as to obtain the inductance of the first inductor and the capacitance of the first resistor.

4 Claims, 6 Drawing Sheets

(56) References Cited

U.S. PATENT DOCUMENTS

| | | | |
|---|---|---|---|
| 2007/0109821 A1* | 5/2007 | Yang ................ | H02M 3/33523 363/21.04 |
| 2007/0247882 A1 | 10/2007 | Chen et al. | |
| 2008/0024092 A1 | 1/2008 | Cho et al. | |
| 2011/0044076 A1 | 2/2011 | Zhang et al. | |
| 2011/0170885 A1 | 7/2011 | Cho et al. | |

FOREIGN PATENT DOCUMENTS

| CN | 101114792 A | 1/2008 |
|---|---|---|
| CN | 101212181 A | 7/2008 |
| CN | 102420525 A | 4/2012 |

OTHER PUBLICATIONS

Office Action for Chinese Patent Application No. 201480061820.X dated Dec. 15, 2017.

\* cited by examiner

CROSS REGULATION CIRCUIT FOR MULTIPLE OUTPUTS AND CROSS REGULATION METHOD THEREOF

PRIORITY STATEMENT

This application is the national phase under 35 U.S.C. § 371 of PCT International Application No. PCT/CN2014/081778 which has an International filing date of Jul. 7, 2014, which designated the United States of America, the entire contents of which are hereby incorporated herein by reference.

FIELD

An embodiment of the present invention generally relates to the field of industrial automation, a cross regulation circuit for multiple outputs and/or a cross regulation method thereof.

BACKGROUND

Cross regulation circuits are widely applied to the field of industrial automation, for example man-machine interaction interfaces on large-scale industry instruments. Transformers are usually used for creating multiple output circuits of security isolation. Especially in the low-voltage industrial field, multiple output isolation circuits based on flyback topology are used commonly. This is because they have low power consumption and it is easy to obtain multiple power outputs.

However, the problem that needs to be taken into account is how to carry out cross regulation, since an output voltage value of one output branch is greatly influenced by other branches, for example factors such as load change of other branches. In particular, in the application scenario of complete isolation, cross regulation is particularly important. For a hardware developer, it generally takes a long time to carry out cross regulation.

FIG. 1 is a circuit connection diagram of an isolation circuit for multiple outputs in the prior art. As shown in FIG. 1, the left part of the circuit is provided with a transformer circuit. An input voltage $V_{dc}$ and output voltages $V_1$ and $V_2$ should be based on the transformer principle and determined according to the number of turns of the three on an iron core. However, since two output branches where the output voltages $V_1$ and $V_2$ are located are closely arranged, when the load of the branch where the output voltage $V_1$ is located changes, and in order to carry out cross regulation so as to obtain an accurate output voltage $V_2$, a low dropout regulator 101 is arranged on the upstream of the circuit of the output voltage $V_2$ for stabilizing the output voltage $V_2$ in the prior art.

Instead, there are some drawbacks, such as high costs, in the prior art where a low dropout regulator is used for regulating an output voltage. In addition, the power consumption of a circuit is high, particularly when there are a lot of loads on the branches of the output voltages $V_1$ and $V_2$.

As shown in FIG. 2, in the prior art, a dummy load device 102 that is connected in parallel and grounded is further arranged on the upstream of the output voltage $V_2$ to consume the redundant voltage of the branch of the output voltage $V_2$. Instead, the dummy load is not suitable to all situations, it is especially and only suitable to the case where a load of the branch of the output voltage $V_1$ is great and a load of the branch of the output voltage $V_2$ is small. In addition, the dummy load 102 may increase system energy loss.

The greater the load of the branch of the output voltage $V_1$ is, the larger the area of a printed circuit board (PCB) occupied by the dummy load 102 is, and this is taken into account based on the factor of heat dissipation.

As shown in FIG. 3, in the prior art, a "sandwich winding method" in which an input and an output of the transformer circuit are differently wound on an iron core is further used for carrying out cross regulation, where $N_p$ represents the number of turns of primary coils of the transformer input, $N_{s1}$ represents the number of turns of secondary coils corresponding to the output voltage $V_1$ of the transformer, and $N_{s2}$ represents the number of turns of secondary coils corresponding to the output voltage $V_2$ of the transformer.

As shown in FIG. 3, on a framework 103, one half of the number of turns $N_p/2$ of the primary coils are firstly wound, then secondary coils $N_{s1}$ and $N_{s2}$ are wound in sequence, and finally one half of the number of turns $N_p/2$ of the primary coils are wound. Drawbacks of the "sandwich winding method" exist in that it has to balance the cross regulation and electromagnetic compatibility, and the costs of the transformer may also be increased. In addition, the framework 103 is generally very long, and in the case where the number of turns of the secondary coils is few, it is hard to wind same uniformly.

SUMMARY

At least one embodiment of the present invention provides a cross regulation circuit for multiple outputs and a cross regulation method thereof.

A first embodiment of the present invention provides a cross regulation circuit for multiple outputs, the cross regulation circuit comprising: an input end; and at least two output ends, wherein a first output end is connected to a feedback circuit, and the feedback circuit is connected to the input end and used for maintaining an output voltage of the first output end by regulating the input end, and wherein a first resistor and a first inductor are connected in series and in sequence to the upstream of other output ends except the first output end, and the first resistor and the first inductor are used for cross regulation.

A second embodiment of the present invention provides a cross regulation method for multiple outputs, wherein the cross regulation method is suitable to the cross regulation circuit described in the first aspect of the present invention, and the cross regulation method comprises: obtaining a first total voltage value on a branch where the first output end is located and a total voltage value on a branch where any one of other output ends is located; measuring an equivalent parasitic inductance value on the branch where any one of other output ends is located, and obtaining equation one depending on whether a divided voltage on the equivalent parasitic inductor equals a reciprocal of the equivalent parasitic inductor multiplied by current and divided by time and a divided voltage on the equivalent parasitic inductor equals a number obtained by subtracting a divided voltage on the first resistor, the first inductor and other loads on the branch from a total voltage value on the branch; measuring a first equivalent parasitic inductance value on the branch where the first output end is located, and obtaining equation two depending on whether a divided voltage on the first equivalent parasitic inductor equals a reciprocal of the first equivalent parasitic inductor multiplied by current and divided by time; and simultaneously solving equation one and equation two to obtain a resistance value of the first resistor on the branch where any one of other output ends is located and an inductance value of the first inductor.

DETAILED DESCRIPTION OF EXAMPLE EMBODIMENTS

Figure 1:
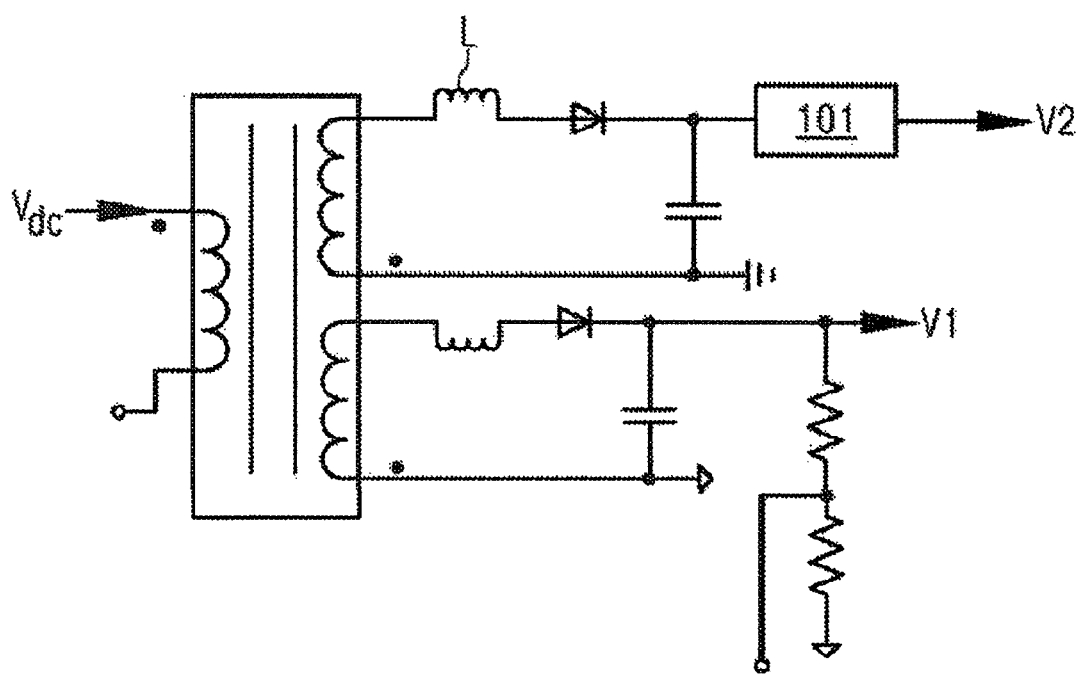
FIG. 1 is a circuit connection diagram of a first cross regulation circuit for multiple outputs in the prior art.
Figure 2:
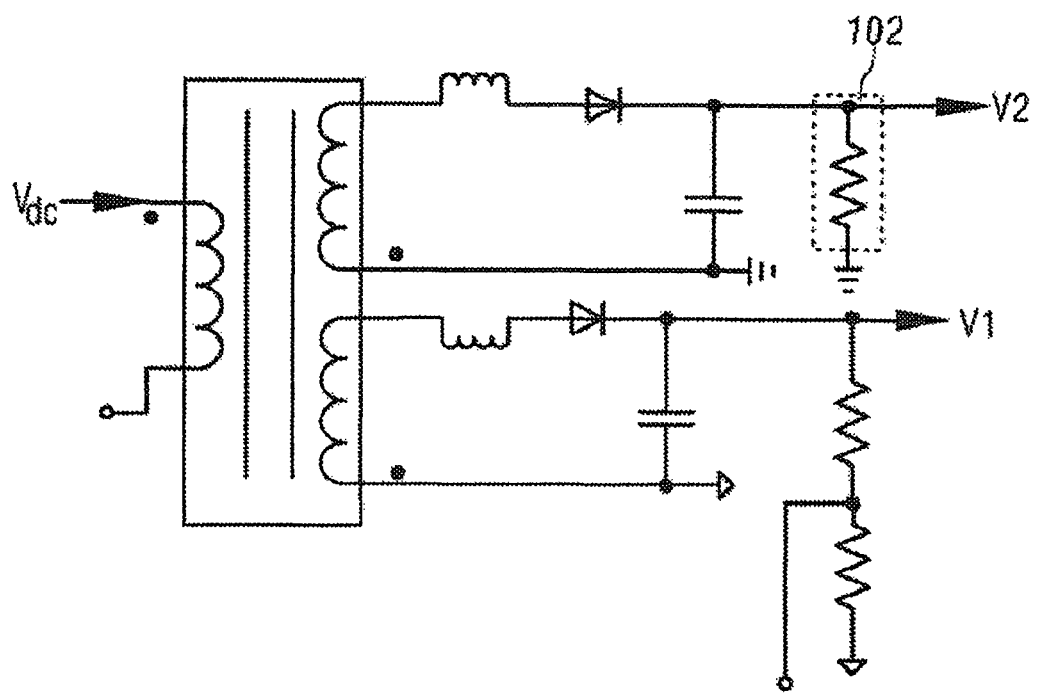
FIG. 2 is a circuit connection diagram of a second cross regulation circuit for multiple outputs in the prior art.

A first embodiment of the present invention provides a cross regulation circuit for multiple outputs, the cross regulation circuit comprising: an input end; and at least two output ends, wherein a first output end is connected to a feedback circuit, and the feedback circuit is connected to the input end and used for maintaining an output voltage of the first output end by regulating the input end, and wherein a first resistor and a first inductor are connected in series and in sequence to the upstream of other output ends except the first output end, and the first resistor and the first inductor are used for cross regulation.

At least one embodiment of the present invention can effectively perform cross regulation on the crosstalk between output voltages merely by connecting a first resistor and a first inductor in series to an output end at once, which is simple in structure and has a low manufacturing cost. At least one embodiment of the present invention can further save the time for adjusting the electromagnetic compatibility and can effectively reduce system heating.

Further, the input end and the output ends are an input end and output ends of a transformer circuit. At least one embodiment of the present invention is especially suitable to a transformer circuit.

Further, a primary coil and several secondary coils of the transformer circuit are wound on an iron core in an overlapped winding manner. Compared with the sandwich winding method in the prior art, the overlapped winding method adopted in at least one embodiment of the present invention is simpler and has a lower manufacturing cost.

Further, the feedback circuit comprises an error amplifier module, an optical coupler and a control circuit connected in sequence to the first output end. The feedback circuit is used for stabilizing an output voltage of the first output end, so that cross regulation can be performed on output voltages of other output ends by taking the first output voltage as a basis.

Further, the input end is further connected to a clamp circuit in parallel, and the clamp circuit comprises a first capacitor and a second inductor that are connected in parallel and a first diode connected to the first capacitor and the second inductor in series. The clamp circuit is used for clamping an output voltage of a switch so as to stabilize the voltage.

Further, the first diode is further connected to a switch, and the other end of the switch is connected to the control circuit. The feedback circuit stabilizes the first output voltage of the first output end by controlling the switch.

Further, the switch is an NMOS, a gate thereof is connected to the control circuit, a source thereof is grounded, and a drain thereof is connected to the first diode.

Further, the feedback circuit is used for implementing the following functions: when a first output voltage of the first output end does not reach a predetermined value, the error amplifier module transmits a difference between the output voltage of the first output end and the predetermined value to the optical coupler, the optical coupler then transmits a signal to the control circuit, and the control circuit modulates the output voltage of the first output end to the predetermined value by regulating the switch of the input end.

Further, an equivalent parasitic inductor is provided on the upstream of the first inductor, and the first output end is also provided with an equivalent parasitic inductor. Since the equivalent parasitic inductance can be measured, a divided voltage on the equivalent parasitic inductor equals a reciprocal of the equivalent parasitic inductance value multiplied by current and divided by time, a divided voltage on the equivalent parasitic inductor equals a number obtained by subtracting a divided voltage on the first resistance, the first inductor and other loads of the branch from a total voltage value on the branch, and simultaneous equations can be obtained.

A second embodiment of the present invention provides a cross regulation method for multiple outputs, wherein the cross regulation method is suitable to the cross regulation circuit described in the first aspect of the present invention, and the cross regulation method comprises: obtaining a first total voltage value on a branch where the first output end is located and a total voltage value on a branch where any one of other output ends is located; measuring an equivalent parasitic inductance value on the branch where any one of other output ends is located, and obtaining equation one depending on whether a divided voltage on the equivalent parasitic inductor equals a reciprocal of the equivalent parasitic inductor multiplied by current and divided by time and a divided voltage on the equivalent parasitic inductor equals a number obtained by subtracting a divided voltage on the first resistor, the first inductor and other loads on the branch from a total voltage value on the branch; measuring a first equivalent parasitic inductance value on the branch where the first output end is located, and obtaining equation two depending on whether a divided voltage on the first equivalent parasitic inductor equals a reciprocal of the first equivalent parasitic inductor multiplied by current and divided by time; and simultaneously solving equation one and equation two to obtain a resistance value of the first resistor on the branch where any one of other output ends is located and an inductance value of the first inductor.

A point of an embodiment of the present invention is the selection of the inductance value of the first inductor, wherein the inductance value plays an important role in cross regulation. According to an embodiment of the present invention, the inductance value can be obtained by simultaneously solving common physics equations. Further, the inductance value of the first inductor is obtained from the equations as follows:

$$(L_{Sn} + L_1) \times \frac{dI_n}{dT} + I_n \times R_1 = V_S \times \frac{N_2}{N_1} - V_O$$

$$L_{S1} \times \frac{dI_1}{dT} = V_S - V_O$$

where $L_{S1}$ represents a parasitic inductance value on the branch where the first output end is located, $L_{Sn}$ represents an equivalent parasitic inductance value on the branch where any one of other output ends is located, $L_1$ represents the inductance value of the first inductor, $I_n$ represents a value of a current flowing through the first inductor, $R_1$ represents the resistance value of the first resistor, $V_s$ represents a winding voltage, $N_1$ represents the number of turns of secondary coils corresponding to the first output end, $N_2$ represents the number of turns of secondary coils corresponding to a second output end, and $V_o$ represents an ideal output voltage value of any one of other output ends.

Further, the equation can be simplified as:

$$L_1 = L_{S1} \times \left(\frac{N_2}{N_1}\right)^2.$$

The simplified equation is much easier to be solved to obtain the inductance value of the first inductor.

Further, the value range of the resistance value of the first resistor is:

$R1 \leq 0.1\Omega$.

The resistance value of the first resistor is used for finely regulating in cross regulation, and when the first inductor ($L_1$) is not precise enough, the first resistor can be used for performing supplement regulation.

The example embodiments of the present invention are described below in conjunction with the accompanying drawings.

The cross regulation circuit and cross regulation method provided in an embodiment of the present invention will be described below taking a transformer circuit for multiple outputs for example. A person skilled in the art should understand that embodiments of the present invention are not limited to be suitable to a transformer circuit, and the embodiments of present invention can be applied to any circuit having multiple outputs.

In addition, embodiments of the present invention do not make any definition on the number of branches of multiple outputs. As long as an output voltage of one of the output branches is maintained by a feedback circuit and a series structure of a first inductor with a specific inductance value and a first resistor provided in embodiments of the present invention is arranged on the upstream of other output branches, the purposes of isolation and avoiding crosstalk, i.e. cross regulation, can be achieved.

Figure 4:
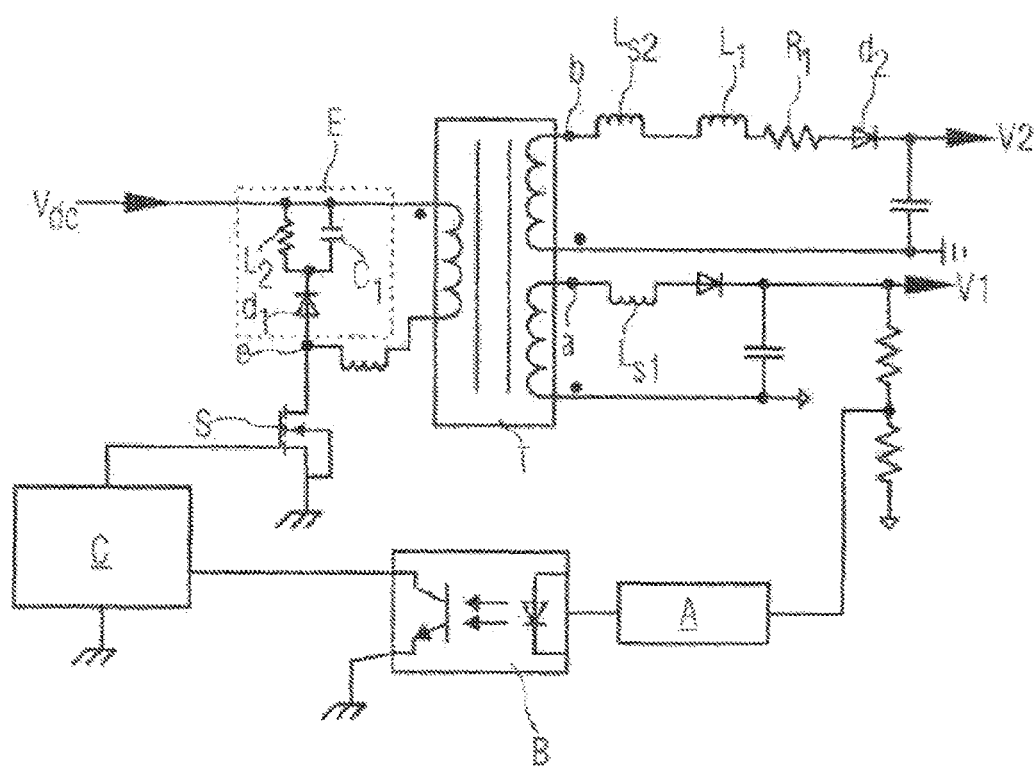
FIG. 4 is a circuit connection diagram of a cross regulation circuit for multiple outputs according to an example embodiment of the present invention.

FIG. 4 is a circuit connection diagram of a cross regulation circuit for multiple outputs according to an example embodiment of the present invention. According to an example embodiment of the present invention, FIG. 4 comprises a transformer circuit, the transformer circuit is provided with an input end and two output ends, wherein the two output ends respectively are a first output end and a second output end, an output voltage corresponding to the first output end is a first output voltage $V_1$, and an output voltage corresponding to the second output end is a second output voltage $V_2$. A transformer is a device for transforming an AC voltage, current and resistance. When an AC current passes through a primary coil, an AC magnetic flux may be generated in an iron core or a magnetic core, so that a voltage or current are inducted in a secondary coil. The transformer is composed of an iron core or a magnetic core and a coil, and the coil has two or more than two windings, wherein a winding connected to a power supply is called a primary coil, and the remaining windings are called secondary coils. Regardless of whether a coil moves and passes through a magnetic field or a magnetic field moves and passes through a fixed coil, an induced electromotive force will be generated in the coil. In these two cases, the value of magnetic flux does not change, but the number of magnetic flux inter-linked with the coil changes, and this is the mutual induction principle. The transformer is a device that transforms a voltage, current and resistance using electromagnetic induction. As shown in FIG. 4, the number of turns of the primary coil of the transformer is $N_p$, and the number of turns of two groups of secondary coils is respectively $N_{s1}$ and $N_{s2}$. Where an AC voltage (i.e. an input voltage $V_{dc}$) is applied to the primary coil, an induced electromotive force (i.e. the first output voltage $V_1$ and the second output voltage $V_2$) will be generated at two ends of the secondary coil. A ratio of the output voltage and the output voltage equals a ratio of the number of turns of the primary coil and the number of turns of the secondary coil.

According to the cross regulation mechanism provided in an embodiment of the present invention, it is necessary to keep the output voltage of one of the output ends stable so as to take same as a basic value of other output voltages and as a basis of cross regulation. As shown in FIG. 4, the first output voltage $V_1$ of the first output end is taken as a basic value according to an example embodiment of the present invention. Particularly, the first output end is connected to a feedback circuit, and the feedback circuit is connected to the input end and used for maintaining the first output voltage $V_1$ of the first output end by regulating the input end, and wherein a first resistor $R_1$ and a first inductor $L_1$ are connected in series and in sequence to the upstream of the second output end, and the first resistor $R_1$ and the first inductor $L_1$ are used for cross regulation performed on the second output voltage $V_2$. Particularly, in the present invention, the second output voltage $V_2$ is mainly regulated by means of the first resistor $R_1$, and the first resistor $R_1$ is used for supplemental fine regulation. The value of the first resistor $R_1$ and the first inductor $L_1$ will be described in detail hereinafter.

Further, the input end is further connected to a clamp circuit E in parallel, the clamp circuit E comprises a second inductor $L_2$ and a first capacitor $C_1$ that are connected in parallel and a first diode $d_1$ connected in series to the second inductor $L_2$ and the first capacitor $C_1$. The clamping circuit E is used for clamping the voltage of point e in the circuit.

Further, the first diode $d_1$ is further connected to a switch S, and the other end of the switch S is connected to the control circuit C. Particularly, the switch is an NMOS, a gate thereof is connected to the control circuit C, a source thereof is grounded, and a drain thereof is connected to the first diode $d_1$.

Further, the first output end is connected to an error amplifier module A, an optical coupler B and the control circuit C in sequence, and the error amplifier module A, the optical coupler B and the control circuit C constitute the feedback circuit. The operation mechanism of the feedback circuit is as follows: when the first output voltage $V_1$ of the first output end does not reach a predetermined value, the error amplifier module A transmits a difference value to the optical coupler B, the optical coupler B then transmits a signal to the control circuit C, and the control circuit C maintains the first output voltage $V_1$ of the first output end by regulating the switch S of the input end.

When it is assumed that an expected first output voltage $V_1$ is 2 V, while an actually output first output voltage is 2.1 V, the feedback circuit detects that the expected first output voltage and the actual first output voltage are inconsistent, the error amplifier module A amplifies the difference value 0.1 by a certain multiple and transmits same to the optical coupler B. It is assumed that the difference value is amplified by 10 multiples, the optical coupler B receives a difference signal of 1 V and transmits same to the control circuit C. The control circuit C then controls a switch S1 to modulate the first output voltage $V_1$ into 2 V.

Figure 3:
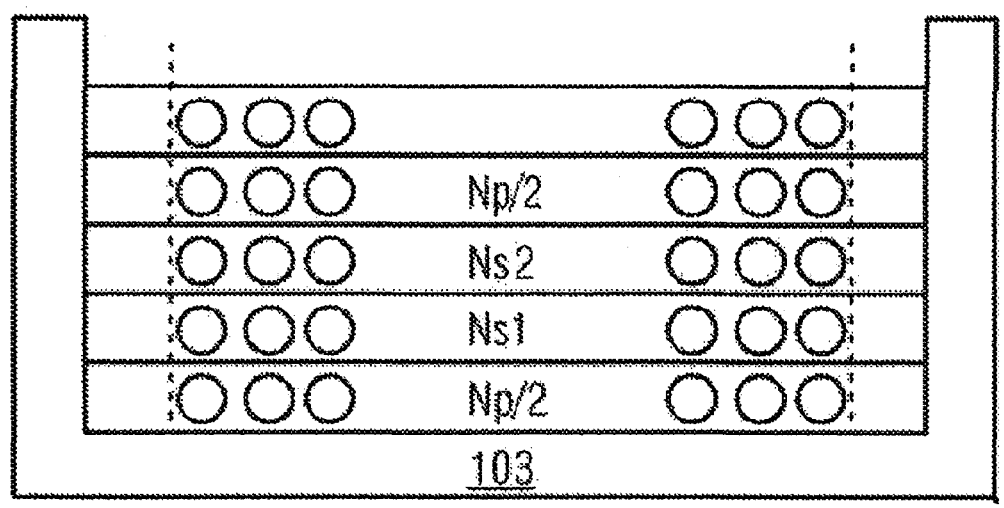
FIG. 3 is a winding method schematic diagram of a primary coil and several secondary coils of the transformer circuit of a third cross regulation circuit for multiple outputs in the prior art.
Figure 5:
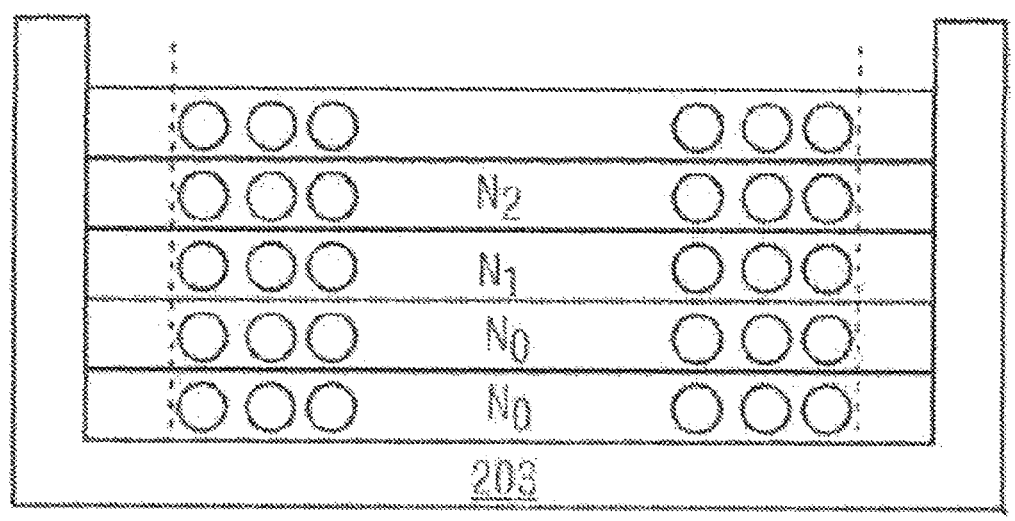
FIG. 5 is a winding method schematic diagram of a primary coil and several secondary coils of the transformer circuit according to an example embodiment of the present invention.

Employing the cross regulation mechanism provided in the present invention, the simplest "overlapped winding method" of the primary coil and the secondary coil can be used in the transformer circuit. FIG. 5 is a winding method schematic diagram of a primary coil and several secondary coils of the transformer circuit according to an example embodiment of the present invention. As shown in FIG. 5, $N_0$ represents the number of turns of primary coils of the transformer input, $N_1$ represents the number of turns of secondary coils corresponding to the first output voltage $V_1$ of the transformer, and $N_2$ represents the number of turns of secondary coils corresponding to the second output voltage $V_2$ of the transformer. As shown in FIG. 3, on a framework 203, the number of turns $N_0$ of the primary coils are firstly wound, and then secondary coils $N_1$ and $N_2$ are wound in sequence. Compared with the "sandwich winding method" in the prior art, the "overlapped winding method" adopted in the present invention is the simplest winding method for a transformer coil, and it does not need a complex structure and has a low manufacturing cost.

In addition, since in the overlapped winding method, a coupling capacitance between a primary coil and a secondary coil and a coupling capacitance between a secondary coil and other coils at the same time are relatively small, the problem of electromagnetic compatibility can also be easily solved. This fully illustrates the advantages of embodiments of the present invention.

The values of the first inductance value and the first resistance value are obtained by means of the method as follows:

Firstly, obtaining a first total voltage value on a branch where the first output end is located, namely a voltage value at point a as shown in FIG. 4, and a total voltage value on a branch where the second output end is located, namely a voltage value at point b. The above-mentioned voltage values can be measured by a voltmeter and can also be obtained by means of a formula of the transformer circuit. Particularly, the above-mentioned voltage values at points a and b can be obtained depending on whether a voltage ratio of a primary voltage and a secondary voltage of the transformer circuit equals a ratio of the number of turns of the primary coil and that of the secondary coil.

Then, an equivalent parasitic inductance value on the branch where any one of other output ends is located is measured. As shown in FIG. 4, it can be equivalently taken into account that an equivalent inductor is connected in series to a leading end of each of the output ends. A first branch corresponds to a first equivalent inductor $L_{s1}$, and a second branch corresponds to a second equivalent inductor $L_{s2}$. In accordance with a physics formula, a divided voltage on the equivalent parasitic inductor equals a reciprocal of the equivalent parasitic inductor multiplied by current and divided by time, and therefore the following equation is obtained:

$$V_{LK} = L_{s2} * \frac{dI_2}{dT}$$

where $V_{LK}$ is a divided voltage of the second equivalent inductor $L_{s2}$, and an inductance value $L_{s2}$ of the second equivalent inductor can be measured by instrument.

In addition, measuring a divided voltage on the equivalent parasitic inductor equals a number obtained by subtracting a divided voltage on the first resistor ($R_1$), the first inductor ($L_1$) and other loads on the branch from a total voltage value on the branch. As shown in FIG. 4, the second branch is further provided with the other load second diode $d_2$, and therefore the following equation is obtained:

$$V_{LK} = V_s \times \frac{N_2}{N_1} - (V_O + V_D) - I_2 \times R_1 - L_1 \times \frac{dI_2}{dT}$$

where $V_{LK}$ represents a leakage inductance voltage, $L_1$ represents an inductance value of the first inductor, $I_2$ represents a value of a current flowing through the first inductor (namely a current flowing through the second branch), $R_1$ represents the resistance value of the first resistor, $V_s$ represents a winding voltage, $N_1$ represents the number of turns of secondary coils corresponding to the first output end, $N_2$ represents the number of turns of secondary coils corresponding to the second output end, $V_o$ represents an ideal voltage value of the second output end, and $V_D$ represents a voltage drop of the second diode d2 connected in series to the second output end.

Therefore, we can then obtain equation one as follows:

$$(L_{S2} + L_1) \times \frac{dI_2}{dT} + I_2 \times R_1 = V_S \times \frac{N_2}{N_1} - (V_O + V_D)$$

Then, a first equivalent parasitic inductance value on the branch where the first output end is located is measured, and equation two is obtained depending on whether a divided voltage on the first equivalent parasitic inductor equals a reciprocal of the first equivalent parasitic inductor ($L_{s1}$) multiplied by current and divided by time:

$$L_{S1} \times \frac{dI_1}{dT} = V_S - (V_O + V_D)$$

Finally, equation one and equation two are simultaneously solved, wherein there are two unknown numbers: the resistance value $R_1$ of the first resistor and the inductance value $L_1$ of the first inductor.

Further, in an embodiment of the present invention, the above-mentioned equation one and equation two can be simplified as:

$$L_1 = L_{S1} \times \left(\frac{N_2}{N_1}\right)^2.$$

On this basis, an approximate value of the inductance value of the first inductor $L_1$ can be obtained.

The first resistor $R_1$ is used for finely regulating in cross regulation, and a value range of the resistance value $R_1$ thereof is:

$$R_1 \leq 0.1\Omega.$$

The second embodiment of the present invention further provides a cross regulation method for multiple outputs, wherein the cross regulation method uses the cross regulation circuit described above. The key point of the cross regulation mechanism of the present invention is the selection of the inductance value of the first inductor $L_1$.

The cross regulation method of an embodiment of the present invention will be described hereinafter with reference to the cross regulation method for a transformer circuit having two output branches as shown in FIG. 4. The cross regulation method comprises the steps as follows:

Firstly, obtaining a first total voltage value on a branch where the first output end is located, namely a voltage value at point a as shown in FIG. 4, and a total voltage value on a branch where the second output end is located, namely a voltage value at point b. The above-mentioned voltage values can be measured by a voltmeter and can also be obtained by means of a formula of the transformer circuit. Particularly, the above-mentioned voltage values at points a and b can be obtained depending on whether a voltage ratio of a primary voltage and a secondary voltage of the transformer circuit equals a ratio of the number of turns of the primary coil and the secondary coil.

Then, an equivalent parasitic inductance value on the branch where any one of other output ends is located is measured. As shown in FIG. 4, it can be equivalently taken into account that an equivalent inductor is connected in series to a leading end of each of the output ends. A first branch corresponds to a first equivalent inductor $L_{s1}$, and a second branch corresponds to a second equivalent inductor $L_{s2}$. In accordance with a physics formula, a divided voltage on the equivalent parasitic inductor equals a reciprocal of the equivalent parasitic inductor multiplied by current and divided by time, and therefore the equation is obtained:

$$V_{LK} = L_{s2} * \frac{dI_2}{dT}$$

where $V_{LK}$ is a divided voltage of the second equivalent inductor $L_{s2}$, and an inductance value $L_{s2}$ of the second equivalent inductor can be measured by instrument.

In addition, measuring a divided voltage on the equivalent parasitic inductor equals a number obtained by subtracting a divided voltage on the first resistor $(R_1)$, the first inductor $(L_1)$ and other loads on the branch from a total voltage value on the branch. As shown in FIG. 4, the second branch is further provided with the other load second diode $d_2$, and therefore the equation is obtained:

$$V_{LK} = V_s \times \frac{N_2}{N_1} - (V_O + V_D) - I_2 \times R_1 - L_1 \times \frac{dI_2}{dT}$$

where $V_{LK}$ represents a leakage inductance voltage, $L_1$ represents an inductance value of the first inductor, $I_2$ represents a value of a current flowing through the first inductor (namely a current flowing through the second branch), $R_1$ represents the resistance value of the first resistor, $V_s$ represents a winding voltage, $N_1$ represents the number of turns of secondary coils corresponding to the first output end, $N_2$ represents the number of turns of secondary coils corresponding to the second output end, $V_o$ represents a desired voltage value of the second output end, and $V_D$ represents a voltage drop of the second diode d2 connected in series to the second output end.

Therefore, we can then obtain equation one as follows:

$$(L_{S2} + L_1) \times \frac{dI_2}{dT} + I_2 \times R_1 = V_S \times \frac{N_2}{N_1} - (V_O + V_D)$$

Then, a first equivalent parasitic inductance value on the branch where the first output end is located is measured, and equation two is obtained depending on whether a divided voltage on the first equivalent parasitic inductor equals a reciprocal of the first equivalent parasitic inductor $(L_{s1})$ multiplied by current and divided by time:

$$L_{S1} \times \frac{dI_1}{dT} = V_S - (V_O + V_D)$$

Finally, equation one and equation two are simultaneously solved, wherein there are two unknown numbers: the resistance value $R_1$ of the first resistor and the inductance value $L_1$ of the first inductor.

Further, in an embodiment of the present invention, the above-mentioned equation one and equation two can be simplified as:

$$L_1 = L_{S1} \times \left(\frac{N_2}{N_1}\right)^2.$$

On this basis, an approximate value of the inductance value of the first inductor $L_1$ can be obtained.

The first resistor $R_1$ is used for finely regulating in cross regulation, and a value range of the resistance value $R_1$ thereof is:

$$R_1 \leq 0.1\Omega.$$

Referring to FIG. 4, table (1) illustrates the values of the first output voltage V1 and the second output voltage V2 on the two branches in the conditions of different output voltage Vdc where the cross regulation mechanism provided in the present invention is not used, wherein a current flowing through the first branch is I1, and a current flowing through the second branch is I2.

TABLE (1)

| | | | the voltage values of multiple outputs without using the present invention | | |
|---|---|---|---|---|---|
| $I_1$ (A) | $I_2$ (A) | $V_{dc}$ (V) | 20 | 24 | 28 |
| 0.5 | 0.05 | $V_1$ (V) | 5.14 | 5.14 | 5.14 |
| | | $V_2$ (V) | 5.65 | 5.65 | 5.65 |
| 1 | 0.05 | $V_1$ (V) | 5.14 | 5.14 | 5.14 |
| | | $V_2$ (V) | 6.11 | 6.11 | 6.12 |
| 0.5 | 0.2 | $V_1$ (V) | 5.14 | 5.14 | 5.14 |
| | | $V_2$ (V) | 5.26 | 5.26 | 5.26 |
| 1 | 0.2 | $V_1$ (V) | 5.14 | 5.14 | 5.14 |
| | | $V_2$ (V) | 5.49 | 5.49 | 5.48 |

Accordingly, table (2) illustrates the values of the first output voltage $V_1$ and the second output voltage $V_2$ on the two branches in the conditions of different output voltage $V_{dc}$ where the cross regulation mechanism provided in the present invention is used, wherein a current flowing through the first branch is $I_1$, and a current flowing through the second branch is $I_2$.

TABLE (2)

the voltage values of multiple outputs using the present invention

| $I_1$ (A) | $I_2$ (A) | $V_{dc}$ (V) | 20 | 24 | 28 |
|---|---|---|---|---|---|
| 0.5 | 0.05 | $V_1$ (V) | 5.14 | 5.14 | 5.14 |
|  |  | $V_2$ (V) | 5.38 | 5.38 | 5.38 |
| 1 | 0.05 | $V_1$ (V) | 5.14 | 5.14 | 5.14 |
|  |  | $V_2$ (V) | 5.64 | 5.64 | 5.64 |
| 0.5 | 0.2 | $V_1$ (V) | 5.14 | 5.14 | 5.14 |
|  |  | $V_2$ (V) | 4.91 | 4.91 | 4.91 |
| 1 | 0.2 | $V_1$ (V) | 5.14 | 5.14 | 5.14 |
|  |  | $V_2$ (V) | 5.15 | 5.15 | 5.15 |

Referring to table (1) and table (2), an expected first output voltage $V_1$ and second output voltage $V_2$ should be consistent, namely approximate to 5.14 V. However, it can be seen from table (1) that the values of V2 are respectively about 5.65 V, 6.11 V, 5.26 V and 5.49 V in the conditions of different input voltages and output currents and all of them are greatly higher than the expected 5.14 V. After the present invention is used, it can be accordingly seen from table (2) that the values are respectively about 5.38 V, 5.64 V, 4.91 V and 5.15 V in the conditions of different input voltages and output currents. Comparatively speaking, in the condition of the same input voltage and output current, after the cross regulation mechanism provided in the present invention is used, the second output voltage $V_2$ is more approximate to the expected value. This further illustrates the advantages of an embodiment of the present invention.

Figure 6:
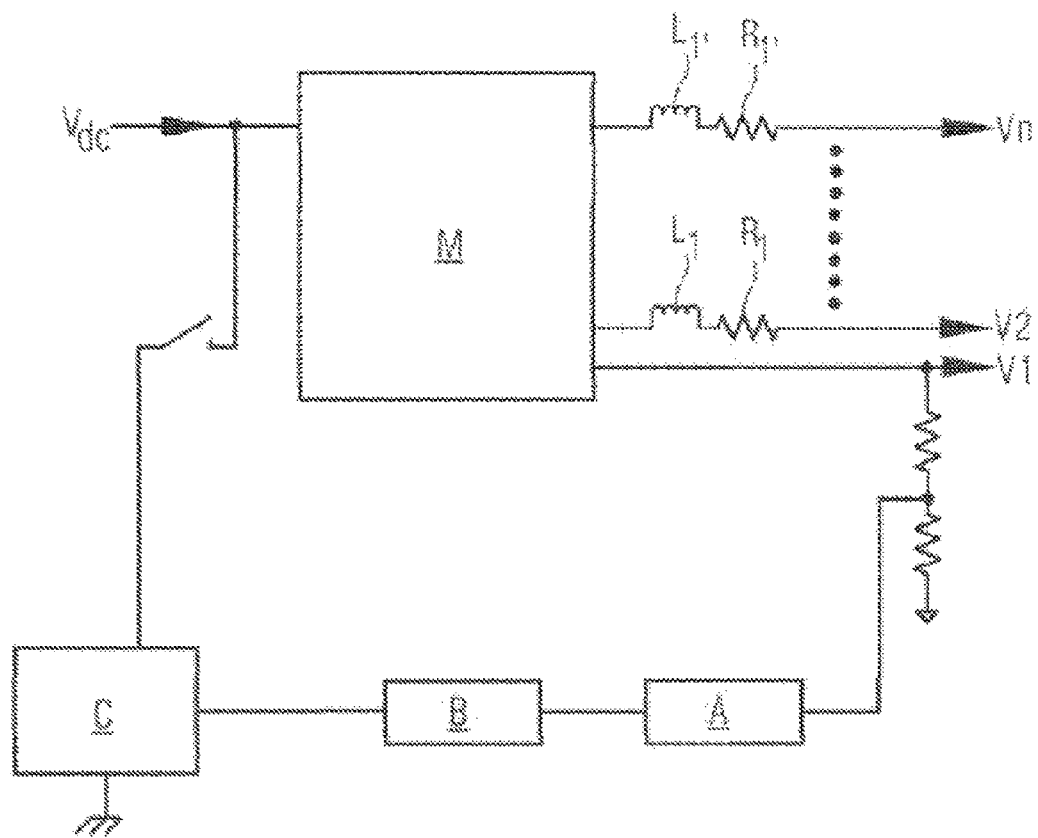
FIG. 6 is a circuit connection diagram of a cross regulation circuit for multiple outputs according to an example embodiment of the present invention, wherein no less than two multiple outputs are comprised.

FIG. 6 is a circuit connection diagram of a cross regulation circuit for multiple outputs according to an example embodiment of the present invention, wherein no less than two multiple outputs are comprised. As shown in FIG. 6, the input voltage is Vdc, the input end is further connected to a switch S, and the switch S is further connected to a feedback circuit.

An input voltage outputs n output voltages through a circuit M, which are respectively a first output voltage $V_1$, a second output voltage $V_2$, . . . , an nth output voltage $V_n$, is output, where n is a natural number greater than 2. The circuit M can be any circuit, and as long as the circuit comprises multiple outputs, it should be covered within the scope of protection of an embodiment of the present invention.

Further, the first output voltage $V_1$ is used as a basic value, and the feedback circuit is used for maintaining a voltage value. The function and structure of the feedback circuit are consistent with that of the feedback circuit described above. The feedback circuit controls the switch S respectively via the error amplifier module A, the optical coupler B and the control circuit C so as to stabilize the first output voltage $V_1$.

Further, a first resistor $R_1$ and a first inductor $L_1$ and a first resistor $R_1'$ and a first inductor $L_1'$ are connected in series in sequence to the upstream of the output ends corresponding to the second output voltage $V_2$, . . . , the nth output voltage $V_n$. The first resistor $R_1$ and the first inductor $L_1$ performs cross regulation based on the stabilized first output voltage $V_1$. The selection of the values of the first inductor and the first resistor connected in parallel to each of the output branches are obtained by calculating according to the load of the branch by means of the cross regulation method described above. For the sake of simplicity, this will not be described again here.

According to an embodiment of the present invention, the time to adjust and rectify a trouble by an engineer can be greatly reduced, especially the time to adjust different winding methods of a transformer coil by an engineer is reduced and the time to adjust the electromagnetic compatibility by an engineer is reduced in particular. Since the manufacturing process required in an embodiment of the present invention is simple, the costs of a transformer are effectively reduced. An embodiment of the present invention can reduce system heating.

Although the contents of embodiments of the present invention have been introduced in detail by way of the above-mentioned preferred embodiments, it should be noted that the description above should not be considered as a limitation to the present invention. After a person skilled in the art reads the contents above, various modifications and replacements of embodiments of the present invention would be obvious. Therefore, the scope of protection of embodiments of the present invention should be defined by the appended claims. In addition, any reference numeral in the claims should not be regarded as a limitation to the related claims; the word "comprising" does not exclude other devices or steps not listed in the claims or the description; words such as "first" and "second" are only used for representing names rather than indicating any specific order.

The invention claimed is:

1. A cross regulation method for multiple outputs, wherein the cross regulation method is suitable for a cross regulation circuit including an input end and at least two output ends, a first output end of the at least two output ends being connected to a feedback circuit, and the feedback circuit being connected to the input end and is usable to maintain an output voltage of the first output end by regulating the input end, wherein a first resistor and a first inductor are connected in series and in sequence to an upstream of other of the at least two output ends, the first resistor and the first inductor being useable for cross regulation, the cross regulation method comprising:
   obtaining a first total voltage value on a branch where the first output end is located and a total voltage value on a branch where any one of other output ends is located;
   measuring an equivalent parasitic inductance value on the branch where any one of other of the at least two output ends is located, and obtaining a first equation depending on whether a divided voltage on the equivalent parasitic inductor equals a reciprocal of the equivalent parasitic inductor multiplied by a current and divided by time and a divided voltage on the equivalent parasitic inductor equals a number obtained by subtracting a divided voltage on the first resistor, the first inductor and other loads on the branch from a total voltage value on the branch;
   measuring a first equivalent parasitic inductance value on the branch where the first output end is located, and obtaining a second equation depending on whether a divided voltage on the first equivalent parasitic inductor equals a reciprocal of the first equivalent parasitic inductor multiplied by current and divided by time; and
   simultaneously solving the first equation and the second equation to obtain a resistance value of the first resistor on the branch where any one of other of the at least two output ends is located and an inductance value of the first inductor.

2. The cross regulation method of claim 1, wherein the inductance value of the first inductor ($L_1$) is obtained from the first and second equations as follows:

$$(L_{Sn} + L_1) \times \frac{dI_n}{dT} + I_n \times R_1 = V_S \times \frac{N_2}{N_1} - V_O$$

$$L_{S1} \times \frac{dI_1}{dT} = V_S - V_O$$

where $L_{S1}$ represents a parasitic inductance value on the branch where the first output end is located, $L_{Sn}$, represents an equivalent parasitic inductance value on the branch where any one of other output ends is located, $L_1$ represents the inductance value of the first inductor, $I_n$ represents a value of a current flowing through the first inductor, $R_1$ represents the resistance value of the first resistor, $V_s$ represents a winding voltage, $N_1$ represents the number of turns of secondary coils corresponding to the first output end, $N_2$ represents the number of turns of secondary coils corresponding to a second output end, and $V_o$ represents an ideal output voltage value of any one of other output ends.

3. The cross regulation method of claim 1, wherein the first and second equations can be simplified as:

$$L_1 = L_{S1} \times \left(\frac{N_2}{N_1}\right)^2$$

where $L_1$ represents the inductance value of the first inductor, $L_{S1}$ represents a parasitic inductance value on the branch where the first output end is located, $N_2$ represents the number of turns of secondary coils corresponding to a second output end, and $N_1$ represents the number of turns of secondary coils corresponding to the first output end.

4. The cross regulation method of claim 1, wherein a value range of the resistance value of the first resistor ($R_1$) is:

$R_1 \leq 0.1 \ \Omega$.

* * * * *